(12) United States Patent
Morioka et al.

(10) Patent No.: US 12,164,728 B2
(45) Date of Patent: Dec. 10, 2024

(54) DETECTION DEVICE, DETECTION SYSTEM, AND DETECTION METHOD

(71) Applicant: Panasonic Intellectual Property Management Co., Ltd., Osaka (JP)

(72) Inventors: Yusuke Morioka, Kanagawa (JP); Yuji Kato, Kanagawa (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 0 days.

(21) Appl. No.: 18/371,143

(22) Filed: Sep. 21, 2023

(65) Prior Publication Data

US 2024/0012519 A1 Jan. 11, 2024

Related U.S. Application Data

(63) Continuation of application No. PCT/JP2021/035883, filed on Sep. 29, 2021.

(30) Foreign Application Priority Data

Mar. 23, 2021 (JP) .................. 2021-048249

(51) Int. Cl.
*G06F 3/041* (2006.01)
*G06F 3/044* (2006.01)

(52) U.S. Cl.
CPC ........ *G06F 3/04186* (2019.05); *G06F 3/0445* (2019.05)

(58) Field of Classification Search
None
See application file for complete search history.

(56) References Cited

U.S. PATENT DOCUMENTS

| 8,816,985 | B1* | 8/2014 | Tate ................. G06F 3/041661 |
| | | | 345/173 |
| 9,323,398 | B2 | 4/2016 | Bernstein et al. |
| 10,268,303 | B2 | 4/2019 | Bernstein et al. |
| 10,698,543 | B2 | 6/2020 | Nakanishi et al. |
| 10,949,014 | B2 | 3/2021 | Kurasawa et al. |

(Continued)

FOREIGN PATENT DOCUMENTS

| JP | 2010-015262 | 1/2010 |
| JP | 2014-238867 | 12/2014 |

(Continued)

OTHER PUBLICATIONS

International Search Report (ISR) from International Searching Authority (Japan Patent Office) in International Pat. Appl. No. PCT/JP2021/035883, dated Oct. 26, 2021, together with an English language translation.

(Continued)

*Primary Examiner* — Matthew Yeung
(74) *Attorney, Agent, or Firm* — GREENBLUM & BERNSTEIN, P.L.C.

(57) ABSTRACT

In a detection device, a drive circuit supplies, to a first sensor electrode, a drive signal (second drive signal) of a different frequency in each of multiple detection periods. A detection circuit performs detection of proximity of an object, based on a detection signal (second detection signal) received from a second sensor electrode disposed in the vicinity of the first sensor electrode in each of the multiple detection periods.

17 Claims, 5 Drawing Sheets

(56) References Cited

U.S. PATENT DOCUMENTS

| | | |
|---|---|---|
| 11,144,165 B2 | 10/2021 | Nakanishi et al. |
| 11,531,432 B2 | 12/2022 | Nakanishi et al. |
| 2011/0007021 A1 | 1/2011 | Bernstein et al. |
| 2016/0188142 A1* | 6/2016 | Oh ..................... G06F 1/3265 345/87 |
| 2016/0209982 A1 | 7/2016 | Bernstein et al. |
| 2017/0003816 A1 | 1/2017 | Bernstein et al. |
| 2018/0095587 A1 | 4/2018 | Kurasawa et al. |
| 2019/0163299 A1* | 5/2019 | Nakanishi ............. G06F 3/0416 |
| 2020/0285333 A1 | 9/2020 | Nakanishi et al. |
| 2021/0382571 A1 | 12/2021 | Nakanishi et al. |
| 2023/0072065 A1 | 3/2023 | Nakanishi et al. |

FOREIGN PATENT DOCUMENTS

| | | |
|---|---|---|
| JP | 2015-018424 | 1/2015 |
| JP | 2018-060327 | 4/2018 |
| JP | 2019-101532 | 6/2019 |

OTHER PUBLICATIONS

Japanese Office Action for Japanese App. No. 2023-508441, dated Jul. 16, 2024 with English translation.

* cited by examiner (COMPARATIVE EXAMPLE)

DETECTION DEVICE, DETECTION SYSTEM, AND DETECTION METHOD

CROSS-REFERENCE TO RELATED APPLICATIONS

This application is a Continuation of International Application No. PCT/JP2021/035883, filed on Sep. 29, 2021, which in turn claims the benefit of Japanese Application No. 2021-048249, filed on Mar. 23, 2021, the disclosures of which Applications are incorporated by reference herein.

BACKGROUND

1. Field

The present disclosure relates to a detection device provided with a proximity detection function.

2. Description of the Related Art

A display device equipped with a display panel and a proximity sensor used to detect a touch and proximity of a detection target is known (see Patent Literature 1, for example). In this display device, electrodes for touch detection are arranged in a display region of the display panel, and electrodes for proximity detection are arranged outside the display region. When proximity detection is performed, a signal is input to the electrodes for touch detection, and the presence or absence of proximity of the detection target is judged based on a signal output from the electrodes for proximity detection.

Patent Literature 1: Japanese Unexamined Patent Application Publication No. 2019-101532

SUMMARY

In the proximity detection technologies, further improvement has been required.

To solve the problem above, a detection device according to one aspect of the present disclosure includes:
  a drive circuit that supplies, to a first sensor electrode, a drive signal of a different frequency in each of multiple detection periods; and a detection circuit that performs detection of proximity of an object, based on a detection signal received from a second sensor electrode disposed in the vicinity of the first sensor electrode in each of the multiple detection periods.

Another aspect of the present disclosure is a detection system. The detection system includes: a sensor that comprises a first sensor electrode, and a second sensor electrode disposed in the vicinity of the first sensor electrode; a drive circuit that supplies, to the first sensor electrode, a drive signal of a different frequency in each of a plurality of detection periods; and a detection circuit that performs detection of proximity of an object, based on a detection signal received from the second sensor electrode in each of the plurality of detection periods.

Yet another aspect of the present disclosure is a detection method. The detection method includes: supplying, to a first sensor electrode, a drive signal of a different frequency in each of a plurality of detection periods; and performing detection of proximity of an object, based on a detection signal received from a second sensor electrode disposed in the vicinity of the first sensor electrode in each of the plurality of detection periods.

BRIEF DESCRIPTION OF DRAWINGS

Embodiments will now be described, by way of example only, with reference to the accompanying drawings which are meant to be exemplary, not limiting, and wherein like elements are numbered alike in several Figures, in which.

DETAILED DESCRIPTION

Figure 1:
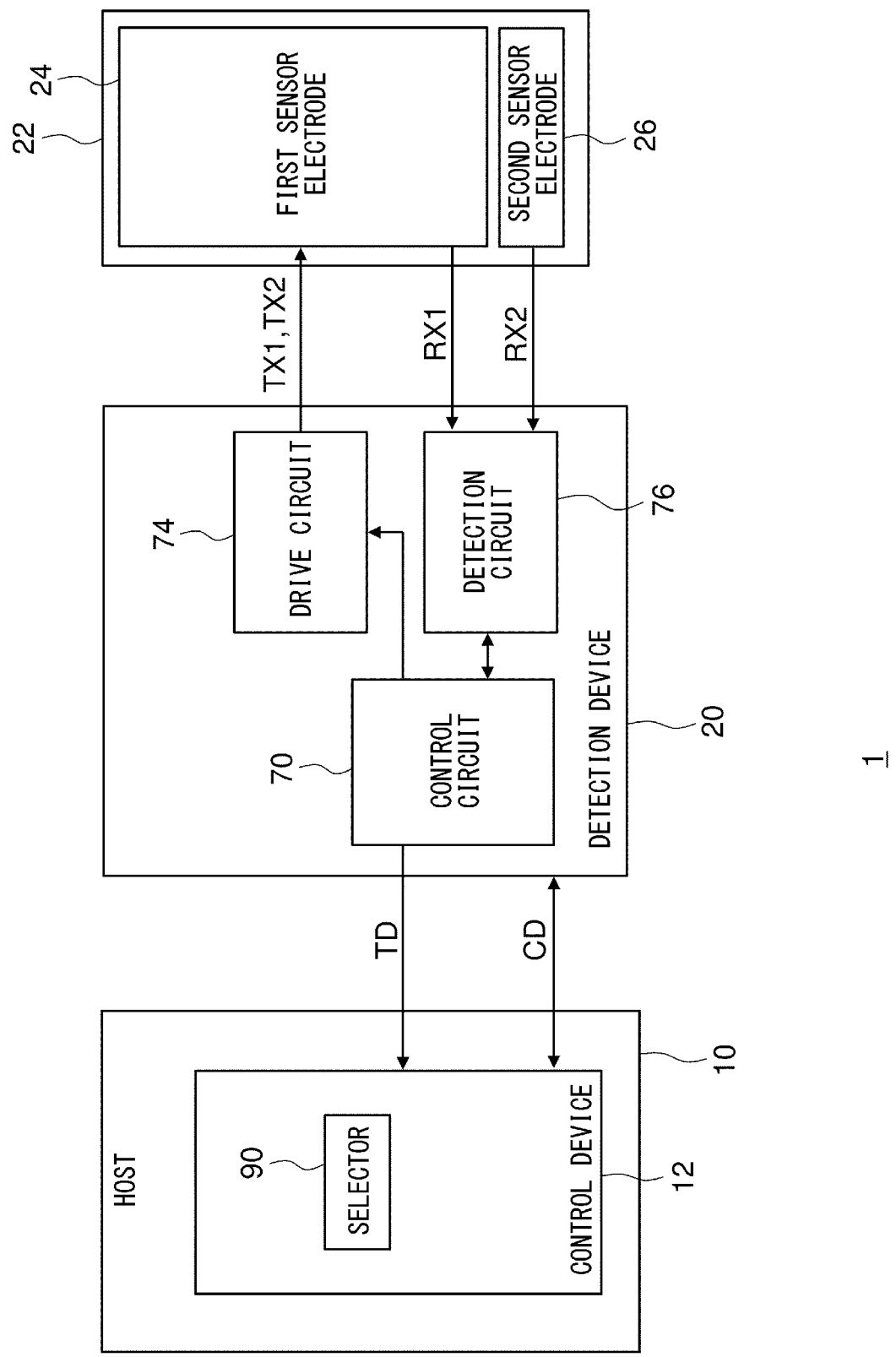
FIG. 1 is a block diagram of a detection system according to an embodiment.

The invention will now be described by reference to the preferred embodiments. This does not intend to limit the scope of the present invention, but to exemplify the invention.

Base Findings of Present Disclosure

Before specific description of an embodiment is given, the underlying findings will be described. As described previously, there is a known technology in which, in order to perform proximity detection on a touch display using the mutual capacitance method, a signal is applied to each of multiple electrodes for touch detection arranged in the display region of an image so as to generate an electric field in the space in front of the display. Then, by reading a signal received from an electrode disposed outside the display region, a change in the electric field caused by proximity of a user's hand or the like to the display is detected.

In such a proximity detection technology, when the detection range, i.e., the detection distance is made longer, the sensitivity to noise is likely to become higher. Therefore, in order to reduce false detection due to noise, it is necessary to distinguish whether the detected signal is due to proximity of a hand or due to noise.

In a comparative example technology recognized by the inventors, the characteristics of proximity of a hand and the characteristics of noise on a time axis are focused on, and although proximity of a hand is continuously detected, signals detected sporadically are regarded as noise and excluded from the proximity detection results, as a noise countermeasure. In this case, however, the inventors have found the problem of requiring a certain amount of time to correctly judge the proximity of a hand and hence the response speed becomes slower. The inventors have also found the problem of increased probability of false detection when noise is continuously present. To solve the problems, a detection system according to the present disclosure is configured as described below.

Like reference characters denote like or corresponding constituting elements, members, and processes in each drawing, and repetitive description will be omitted as appropriate. Also, the dimensions of a member may be appropriately enlarged or reduced in each drawing in order to facilitate understanding.

FIG. 1 is a block diagram of a detection system 1 according to an embodiment. Although an example will be described in which the detection system 1 is used in combination with a vehicle-mounted display device mounted on a vehicle, such as an automobile, to detect a touch and proximity of an object to the display device, the application is not particularly limited. The detection system 1 may detect a touch or the like on a display device such as a mobile device, or may detect a touch or the like without combination with a display device.

The detection system 1 includes a host 10, a detection device 20, and a sensor 22. The host 10 controls the detection device 20. The host 10 includes a control device 12.

The control device 12 may be a CPU, for example, and also called a host CPU. The control device 12 includes a selector 90 that selects an operation mode of the detection system 1. The selector 90 selects a first mode in which touch detection is performed, or a second mode in which proximity detection is performed. The first mode can also be referred to as a touch detection mode, and the second mode can also be referred to as a proximity detection mode.

For example, the selector 90 selects the second mode until proximity of an object is detected in a standby state in which no image is displayed on the display device, and, when proximity is detected in the second mode, the selector 90 selects the first mode. In this case, the display device is released from the standby state and starts image display. When a condition for transition to the standby state is satisfied in the first mode, the selector 90 may select the second mode. The conditions on which the selector 90 selects the first mode or the second mode may be determined as appropriate, depending on the application of the detection system 1. The first mode and the second mode will be detailed later.

The control device 12 supplies, to the detection device 20, control data CD including information on the operation mode and controls the detection device 20 based on such data.

The sensor 22 is a sensor for detecting a touch or proximity of an object to a display surface of a display device. The sensor 22 includes a first sensor electrode 24 and a second sensor electrode 26.

Figure 2:
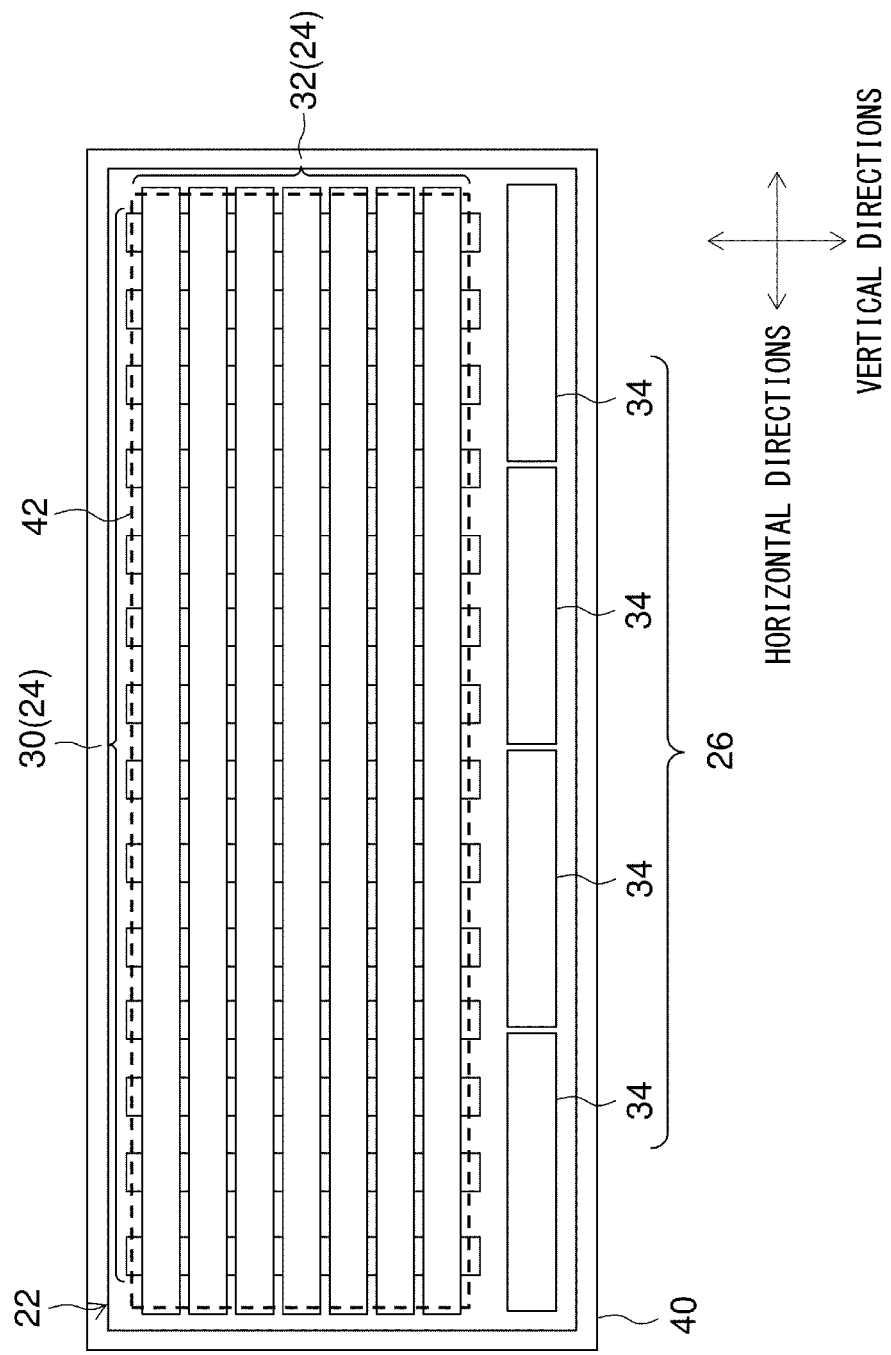
FIG. 2 is a schematic plan view of the sensor shown in FIG. 1, disposed on a display device.

FIG. 2 is a schematic plan view of the sensor 22 shown in FIG. 1, disposed on a display device 40. FIG. 2 is a diagram of the display device 40 viewed from the observer's side. The display device 40 displays an image in a display region 42. The display device 40 may be, for example, an out-cell display device.

The first sensor electrode 24 of the sensor 22 is superimposed on the display region 42 of the display device 40. The first sensor electrode 24 includes multiple first electrodes 30 extending in a vertical direction and multiple second electrodes 32 extending in a horizontal direction. The multiple first electrodes 30 are arranged at substantially equal intervals in a horizontal direction. The multiple second electrodes 32 are arranged at substantially equal intervals in a vertical direction. The multiple first electrodes 30 and the multiple second electrodes 32 intersect. As the first sensor electrode 24, an electrode configuration of a publicly-known touch sensor may be employed.

The second sensor electrode 26 is disposed in the vicinity of the first sensor electrode 24, and, in the example of FIG. 2, the second sensor electrode 26 is disposed below the first sensor electrode 24. The second sensor electrode 26 does not overlap the display region 42. The second sensor electrode 26 includes multiple third electrodes 34 arranged in a horizontal direction. The second sensor electrode 26 may also be disposed above, to the left or right of the first sensor electrode 24, or may be disposed to surround the first sensor electrode 24.

The description now returns to FIG. 1. The detection device 20 may be configured as an IC, for example, and performs touch detection and proximity detection using the sensor 22, according to the control data CD from the host 10. The detection device 20 includes a control circuit 70, a drive circuit 74, and a detection circuit 76.

The control circuit 70 may be constituted by a microcomputer, for example, and controls signal generation timing of the drive circuit 74, touch or proximity detection timing of the detection circuit 76, and the like.

In the first mode, the control circuit 70 controls the drive circuit 74 and the detection circuit 76 such that touch detection is performed based on the mutual capacitance method. For the touch detection, a publicly-known technology can be employed.

Under the control of the control circuit 70, the drive circuit 74 generates a first drive signal TX1 in the first mode. The first drive signal TX1 may also be referred to as a touch drive signal. The first drive signal TX1 may be a square wave signal or may be a sine wave signal. In the first mode, the drive circuit 74 supplies the first drive signal TX1 to each of the multiple second electrodes 32 of the first sensor electrode 24 sequentially with time. The drive circuit 74 does not supply the first drive signal TX1 to the first electrodes 30 and the third electrodes 34 in the first mode.

In the first mode, the detection circuit 76 detects a touch by an object on the display device 40. Under the control of the control circuit 70, the detection circuit 76 performs, in the first mode, detection of a touch by an object, based on a first detection signal RX1 received from a first electrode 30 when the first drive signal TX1 is supplied to each second electrode 32. The detection circuit 76 outputs information on a detected touch position to the control circuit 70.

In the second mode, the control circuit 70 controls the drive circuit 74 and the detection circuit 76 such that proximity detection is performed based on the mutual capacitance method.

Under the control of the control circuit 70, in the second mode, the drive circuit 74 generates a second drive signal TX2 and supplies the second drive signal TX2 to the first sensor electrode 24, i.e., each of the multiple first electrodes 30 and the multiple second electrodes 32. The drive circuit 74 does not supply the second drive signal TX2 to the second sensor electrode 26 in the second mode. The waveform and amplitude of the second drive signal TX2 may be appropriately determined through experiments or simulations so that desired proximity detection performance can be obtained. The waveform and amplitude of the second drive signal TX2 may be the same as or different from the waveform and the like of the first drive signal TX1.

In the second mode, the detection circuit 76 detects proximity of an object to the display device 40. Under the control of the control circuit 70, the detection circuit 76 performs, in the second mode, detection of proximity of an object to a position corresponding to any of the third electrodes 34, based on a second detection signal RX2 received from the second sensor electrode 26, i.e., the multiple third electrodes 34, when the second drive signal TX2 is supplied to the first sensor electrode 24. The detection circuit 76 outputs information on a detected proximity position to the control circuit 70. The detection circuit 76 need not necessarily detect the proximity position, and the detection circuit 76 may judge the presence or absence of proximity of an object and output, to the control circuit 70, information indicating the detection of proximity.

In the first mode, based on the touch position information from the detection circuit 76, the control circuit 70 derives coordinate data TD of the touch position and outputs the coordinate data TD to the control device 12 in the host 10. In the second mode, based on the proximity position information from the detection circuit 76, the control circuit 70 derives coordinate data TD of the proximity position and outputs the coordinate data TD to the control device 12 in the host 10. The control device 12 performs various processes according to the coordinate data TD.

The configurations of the control device 12 and the control circuit 70 can be implemented by cooperation between hardware resources and software resources or only by hardware resources. As the hardware resources, analog devices, microcomputers, DSPs, ROMs, RAMs, FPGAs, or other LSIs can be employed. As the software resources, programs, such as firmware, can be employed.

Figure 3:
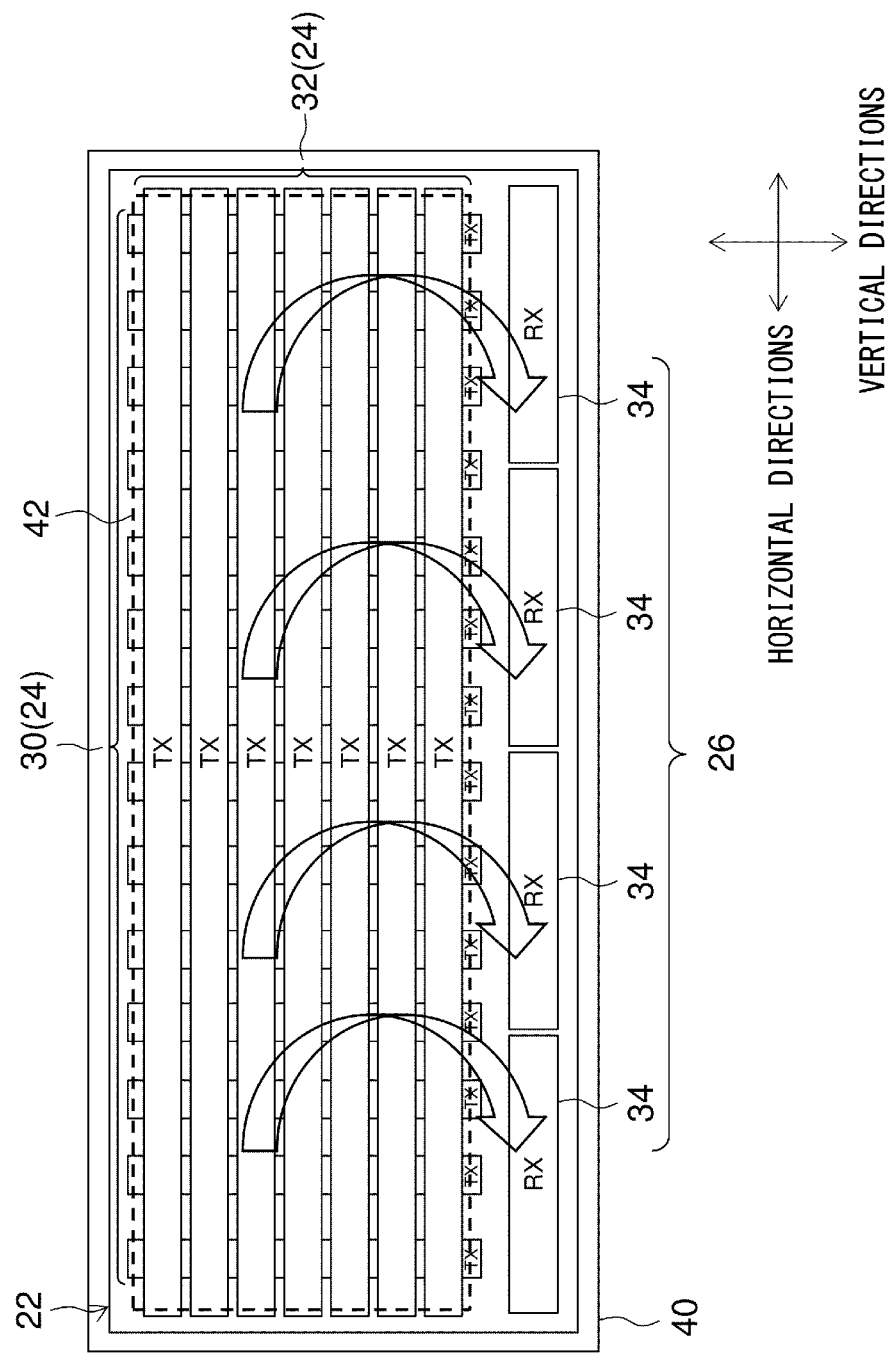
FIG. 3 is a diagram that shows the operation in a second mode of the sensor shown in FIG. 1.

There will now be described the operation in the second mode in detail. FIG. 3 is a diagram that shows the operation in the second mode of the sensor 22 shown in FIG. 1. In FIG. 3, "TX" is indicated on each of the first electrodes 30 and the second electrodes 32 of the first sensor electrode 24 to which the second drive signal TX2 is supplied, and "RX" is indicated on each of the third electrodes 34 of the second sensor electrode 26 from which the second detection signal RX2 is output.

When the second drive signal TX2 is supplied, an electric field is generated between the first sensor electrode 24 and the second sensor electrode 26. In FIG. 3, a schematic electric field is indicated by arrows. Since the total area of the first sensor electrode 24 is larger than the total area of the second sensor electrode 26, the electric field can be generated over a relatively large region and can be generated at a distance in the normal direction of the display surface of the display device 40, i.e., in the space on the front side of the display device Therefore, an object in proximity to the display surface affects the electric field, even if the object is not in contact with the display surface.

When the presence of an object in proximity to the display surface affects the electric field, the second detection signal RX2 changes, compared to the case where the object is not present. By detecting such a change, the detection circuit 76 detects proximity of an object. Also in the first mode, even if an object does not touch the display surface, if the object comes close enough to the display surface to cause a detectable increase in parasitic capacitance, it could be detected that there has been a touch. In the second mode, however, proximity over a distance longer than the distance between the display surface and an object that is detectable in the first mode, can also be detected. For the proximity detection using the second detection signal RX2, a publicly-known technology can be employed.

The detection circuit 76 can distinguish the second detection signal RX2 received from each third electrode 34. Therefore, in the second mode, the detection circuit 76 can detect a third electrode 34 to which there was proximity of an object, from among the multiple third electrodes 34. Accordingly, in addition to the presence or absence of proximity of an object, a schematic position where an object was in proximity can also be identified.

In the second mode, the drive circuit 74 supplies, to the first sensor electrode 24, the second drive signal TX2 of a different frequency in each of multiple detection periods. In other words, the drive circuit 74 changes the frequency of the second drive signal TX2 for each detection period. The multiple detection periods may be collectively referred to as a proximity detection period in which the presence or absence of proximity of an object is detected.

Figure 4:
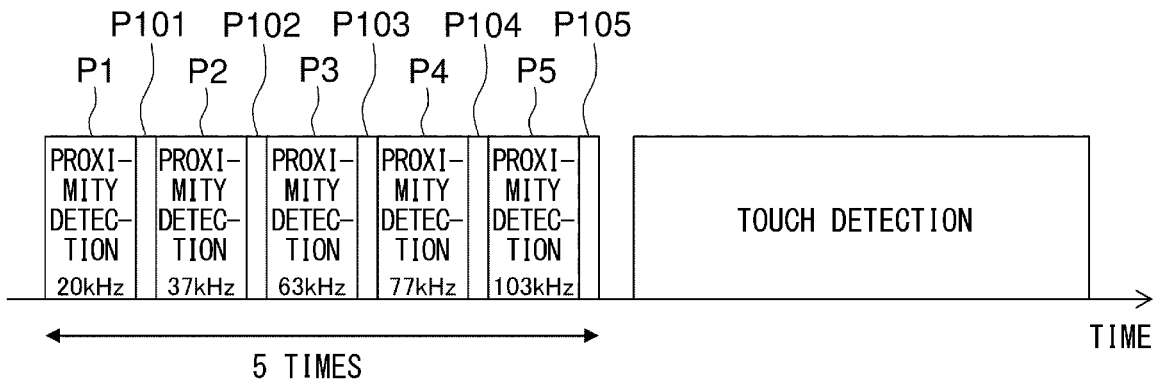
FIG. 4 is a diagram that shows multiple detection periods in the second mode of the detection system shown in FIG. 1.

FIG. 4 is a diagram that shows multiple detection periods in the second mode of the detection system 1 shown in FIG. 1. In this example, a first detection period P1, a first touch detection period P101, a second detection period P2, a second touch detection period P102, a third detection period P3, a third touch detection period P103, a fourth detection period P4, a fourth touch detection period P104, a fifth detection period P5, and a fifth touch detection period P105 are chronologically arranged in this order.

The first touch detection period P101 to the fifth touch detection period P105 are periods during which proximity detection is stopped and touch detection is performed as in the first mode. Even when proximity of an object is not detected for some reason in the second mode, if the object touches the display surface, the touch will be detected during these touch detection periods. When a touch is detected, the touch detection in the first mode is continuously performed. The first touch detection period P101 to the fifth touch detection period P105 may not be provided, in which case the first detection period P1 to the fifth detection period P5 are arranged continuously. The number of detection periods is not limited to "5" and may be appropriately determined through experiments or simulations.

The frequencies of the second drive signal TX2 supplied respectively in the multiple detection periods may preferably be different from natural number multiples of each other. In the example of FIG. 4, the frequency of the second drive signal TX2 is 20 kHz in the first detection period P1, 37 kHz in the second detection period P2, 63 kHz in the third detection period P3, 77 kHz in the fourth detection period P4, and 103 kHz in the fifth detection period P5.

In the second mode, the detection circuit 76 performs detection of proximity of an object, based on the second detection signal RX2 received from the second sensor electrode 26 in each of the multiple detection periods. In specific, the detection circuit 76 provisionally judges the presence or absence of proximity of an object in each of the multiple detection periods based on the second detection signal RX2 received from the second sensor electrode 26, and, when it is provisionally judged that there was proximity of an object in a predetermined number or more of the multiple detection periods, the detection circuit 76 formally judges that there was proximity of an object. When it is not provisionally judged that there was proximity of an object in the predetermined number or more of the multiple detection periods, the detection circuit 76 formally judges that there was no proximity of an object. The frequency of the second drive signal TX2 and the predetermined number may be appropriately determined through experiments or simulations so that noise is less likely to be falsely detected, based on the noise and the like in the environment where the detection system 1 is used.

If the detection circuit 76 has formally judged that there was no proximity of an object during multiple detection periods in a proximity detection period, the processing by the drive circuit 74 of supplying the second drive signal TX2 and the processing by the detection circuit 76 of performing proximity detection will be performed again during multiple detection periods in the next proximity detection period. In other words, in the second mode, a series of provisional and formal judgments are repeatedly performed until it is formally judged that there was proximity of an object.

In the example of FIG. 4, the detection circuit 76 uses the second detection signal RX2 received during the five detection periods from the first detection period P1 to the fifth detection period P5 to formally judge the presence or absence of proximity, after the completion of the fifth detection period P5. For example, assuming that each detection period is 10 ms and each touch detection period is 2 ms, one formal judgment regarding the presence or absence of proximity is completed in about 60 ms. Also, when the predetermined number is "5" and if it is provisionally judged that there was proximity in each of the five detection periods, for example, it will be formally judged that there was proximity. In FIG. 4, after it is formally judged that there was proximity, the touch detection in the first mode is continuously performed.

A detection system of a comparative example will now be described. The basic configuration of the detection system in the comparative example is the same as that of the detection system 1 in the embodiment. However, the number of detection periods included in a proximity detection period in which the presence or absence of proximity is detected and the frequency of the second drive signal TX2 for each detection period are different from those in the embodiment.

Figure 5:
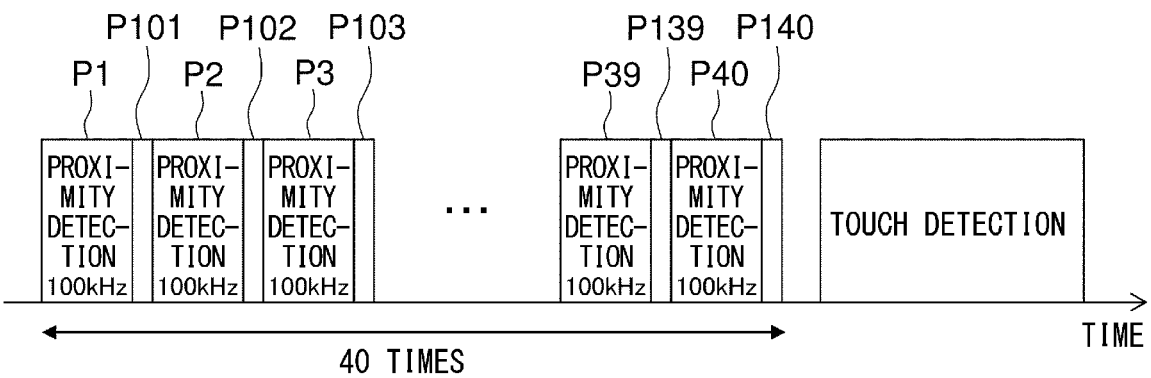
FIG. 5 is a diagram that shows multiple detection periods in the second mode of a detection system in a comparative example.

FIG. 5 is a diagram that shows multiple detection periods in the second mode of the detection system in the comparative example. In this example, the first detection period P1, the first touch detection period P101, the second detection period P2, the second touch detection period P102, the third detection period P3, the third touch detection period P103, . . . , a 39th detection period P39, a 39th touch detection period P139, a 40th detection period P40, and a 40th touch detection period P140 are chronologically arranged in this order. The number of detection periods is "40".

The frequency of the second drive signal TX2 is the same for each detection period and may be 100 kHz, for example. As in FIG. 4, assuming that each detection period is 10 ms and each touch detection period is 2 ms, one formal judgment regarding the presence or absence of proximity is completed in about 480 ms.

For example, if it is provisionally judged that there was proximity of an object in 32 or more of the 40 detection periods, it will be formally judged that there was proximity of an object. If it is provisionally judged that there was proximity of an object in less than 32 of the 40 detection periods, it will be formally judged that there was no proximity of an object.

When an object such as a hand is in proximity, it is conceivable that the object is continuously in proximity for 480 ms, and it can be provisionally judged that there was proximity during the 40 detection periods. Therefore, the proximity of the object can be detected. Meanwhile, if no object is in proximity but there is noise that contains a frequency component around 100 kHz, which is the same as the frequency of the second drive signal TX2, it may be provisionally judged that there was proximity in some detection periods, depending on the intensity of the noise. However, since there is a relatively high probability that such noise is not present continuously but is present discretely, the number of detection periods in which it is provisionally judged that there was proximity is likely to be smaller than in the case of proximity of an object. Therefore, by increasing the number of detection periods, false detection of noise can be made less likely to occur. However, there is also a possibility that the noise with a frequency component around 100 kHz is present continuously, in which case it may be falsely detected as proximity. Further, since it takes about 480 ms to formally judge that there was proximity of an object, the user may feel that it is too late before the proximity is detected after the user brings his or her hand close to the display device.

In contrast to the comparative example, in the embodiment, since the frequency of the second drive signal TX2 is different for each detection period, even if noise with specific frequency characteristics is continuously present, the number of detection periods in which it is provisionally judged that there was proximity of an object is likely to be smaller. For example, if noise that contains a frequency component around 103 kHz and substantially does not contain frequency components around 77 kHz, 63 kHz, 37 kHz, and 20 kHz is continuously present, it may be provisionally judged that there was no proximity in the first detection period P1 to the fourth detection period P4 but there was proximity only in the fifth detection period P5. Further, when it is assumed that the frequency of the second drive signal TX2 is ½, ¼, or the like of the frequency of noise, it is likely to be provisionally judged that there was proximity in multiple detection periods during which the second drive signal TX2 with such a frequency is supplied. In the embodiment, however, since the multiple frequencies of the second drive signal TX2 are different from natural number multiples of each other, it is less likely to be provisionally judged that there was proximity in multiple detection periods due to noise.

Meanwhile, when an object such as a user's hand that is grounded is in proximity, it acts as a ground for the electric field, so that the proximity is detected independent of the frequency of the second drive signal TX2. In other words, when the object is in proximity, it is likely to be provisionally judged that there was proximity in each of the first detection period P1 to the fifth detection period P5. Accordingly, while reducing false detection due to noise, the number of detection periods included in one proximity detection period, i.e., the number of detection periods required for one formal judgment, can also be reduced compared to the comparative example. Therefore, the proximity of an object can be detected more accurately in a shorter time.

Figure 6:
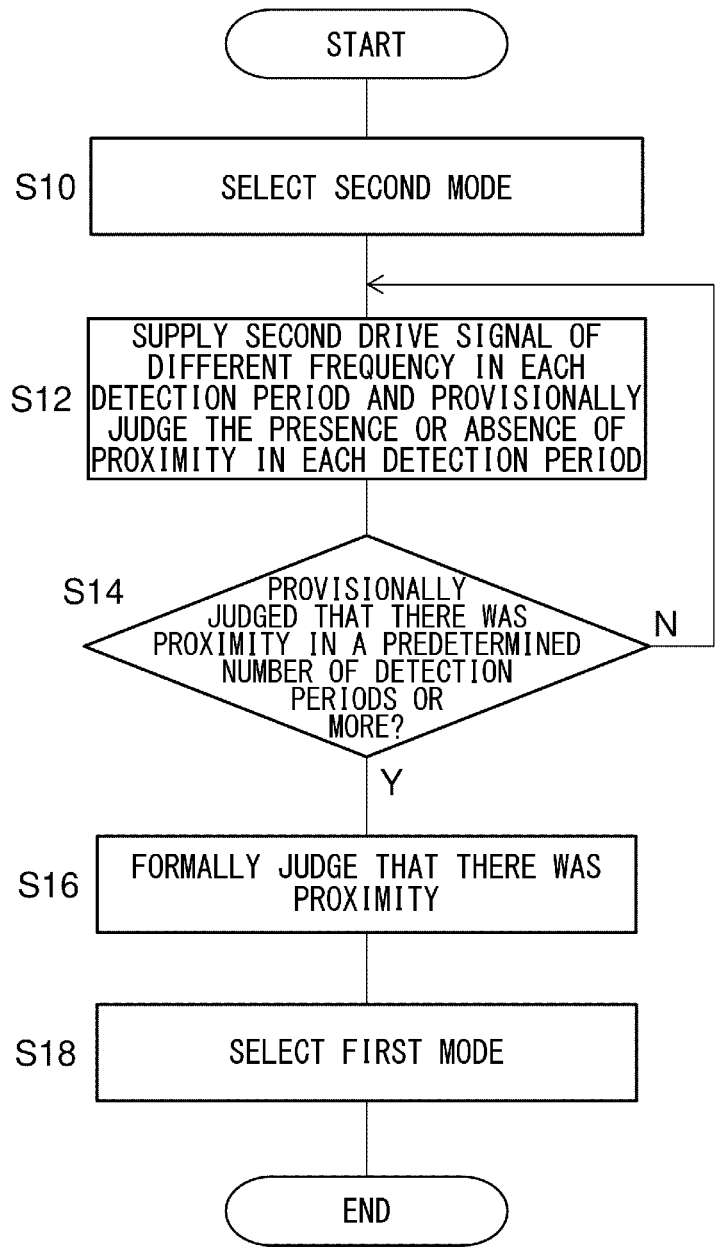
FIG. 6 is a flowchart that shows detection processing performed in the detection system shown in FIG. 1.

There will now be described the overall operation of the detection system 1 having the configuration set forth above. FIG. 6 is a flowchart that shows detection processing performed in the detection system 1 shown in FIG. 1. The processing shown in FIG. 6 starts when a selection condition for the second mode is met. The selector 90 selects the second mode (S10). The drive circuit 74 supplies, to the first sensor electrode 24, the second drive signal TX2 of a different frequency in each detection period, and the detection circuit 76 provisionally judges the presence or absence of proximity in each detection period (S12). When it is not provisionally judged that there was proximity in a predetermined number of detection periods or more (N at S14), the process returns to S12. When it is provisionally judged that there was proximity in the predetermined number of detection periods or more (Y at S14), the detection circuit 76 formally judges that there was proximity (S16), and the selector 90 selects the first mode (S18).

If it is provisionally judged that there was proximity in a predetermined first number of detection periods or more and less than a predetermined second number of detection periods, the next detection regarding the presence or absence of proximity may be performed using the second drive signal TX2 with a frequency different from the previous five kinds of frequencies. For example, when the number of detection periods is "5", the first number may be "4" and the second number may be "5". The first number and the second number may be appropriately determined through experiments or simulations.

For example, if the detection circuit 76 provisionally judges that there was proximity of an object in the first number or more and less than the second number of multiple detection periods, the drive circuit 74 may supply, to the first sensor electrode 24, the second drive signal TX2 of different frequencies, which are also different from the multiple frequencies of the second drive signal TX2 in the multiple detection periods, respectively in the next multiple detection periods. In other words, the presence or absence of proximity is judged again using frequencies different from the frequencies with which a provisional judgment has been performed. If the detection circuit 76 provisionally judges that there was proximity of an object in less than the first number of multiple detection periods, the drive circuit 74 may supply, to the first sensor electrode 24, the second drive signal TX2 of different frequencies, which are the same as the multiple frequencies in the multiple detection periods, respectively in the next multiple detection periods. The detection circuit 76 performs detection of proximity of an object, based on the second detection signal RX2 received from the second sensor electrode 26 in each of the next multiple detection periods. If it is provisionally judged that there was proximity of an object in the second number or more of multiple detection periods, the detection circuit 76 will formally judge that there was proximity of an object.

For example, in the example of FIG. 4, if it is provisionally judged that there was no proximity in the second detection period P2 and that there was proximity in the other four detection periods and if noise was detected in those four detection periods, the same provisional judgment result is highly likely to be obtained when the second drive signal TX2 of the same five frequencies is used again, so that it is difficult to judge whether or not noise was detected. Therefore, by using the second drive signal TX2 of other five frequencies, if it is due to noise, the number of times it is provisionally judged that there was proximity of an object is likely to be less than four times, so that it can be judged more certainly that it is not proximity of an object.

Alternatively, if the detection circuit 76 provisionally judges that there was proximity of an object in the first number or more and less than the second number of multiple detection periods, the drive circuit 74 may supply, to the first sensor electrode 24, the second drive signal TX2 of a frequency that is the frequency of the second drive signal TX2 supplied during a detection period in which it was provisionally judged that there was no proximity of an object, in each of the next multiple detection periods. For example, if it is provisionally judged that there was no proximity in the second detection period P2 and that there was proximity in the other four detection periods in the example of FIG. 4, the second drive signal TX2 of 37 kHz supplied in the second detection period P2 may be supplied in the next five detection periods. Accordingly, if it is due to noise, it is highly likely to be provisionally judged that there was no proximity of an object in the next five detection periods, so that it can be judged more certainly that it is not proximity of an object.

According to the present embodiment, proximity can be detected more accurately in a shorter time. Also, since the frequencies of the second drive signal TX2 supplied respectively in multiple detection periods are different from natural number multiples of each other, even when there is noise that contains a frequency component of the second drive signal TX2, it is less likely to be provisionally judged that there was proximity in multiple detection periods. This can reduce false detection due to noise more certainly.

The present disclosure has been described with reference to an embodiment. The embodiment is intended to be illustrative only, and it will be obvious to those skilled in the art that various modifications to a combination of constituting elements or processes in the embodiment could be developed and that such modifications also fall within the scope of the present disclosure.

For example, although an example has been described in the embodiment in which touch detection is performed in the first mode based on the mutual capacitance method, the touch detection may be performed based on the self-capacitance method. Also, although an example of an out-cell display device has been described in the embodiment, the display device may be an in-cell display device. Also, the detection device 20 may be included in the host 10. These modifications allow greater flexibility in the configuration of the detection system 1.

A detection device according to one aspect of the present disclosure includes:

a drive circuit that supplies, to a first sensor electrode, a drive signal of a different frequency in each of multiple detection periods; and a detection circuit that performs detection of proximity of an object, based on a detection signal received from a second sensor electrode disposed in the vicinity of the first sensor electrode in each of the multiple detection periods.

According to this aspect, proximity of an object can be detected more accurately in a shorter time.

In the detection device according to the one aspect of the present disclosure, for example, frequencies of the drive signal supplied respectively in the multiple detection periods may be different from natural number multiples of each other.

In this case, false detection due to noise that contains a frequency component of the drive signal can be reduced more certainly.

In the detection device according to the one aspect of the present disclosure, for example, the detection circuit may provisionally judge the presence or absence of proximity of an object in each of the multiple detection periods, based on a detection signal received from the second sensor electrode and formally judge that there was proximity of an object when it is provisionally judged that there was proximity of an object in a predetermined number or more of the multiple detection periods.

In this case, since the number of detection periods in which it is provisionally judged that there was proximity due to noise that contains a frequency component of the drive signal is likely to be smaller, false detection can be reduced.

In the detection device according to the one aspect of the present disclosure, for example, the detection circuit may provisionally judge the presence or absence of proximity of an object in each of the multiple detection periods, based on a detection signal received from the second sensor electrode, when the detection circuit provisionally judges that there was proximity of an object in a predetermined first number or more and less than a predetermined second number of the multiple detection periods, the drive circuit may supply, to the first sensor electrode, a drive signal of a frequency that is the frequency of the drive signal supplied during a detection period in which it was provisionally judged that there was no proximity of an object, in each of next multiple detection periods, and the detection circuit may perform detection of proximity of an object, based on a detection signal received from the second sensor electrode in each of the next multiple detection periods.

In this case, when noise is present, it can be judged more certainly that it is not proximity of an object.

In the detection device according to the one aspect of the present disclosure, for example, the detection circuit may provisionally judge the presence or absence of proximity of an object in each of the multiple detection periods, based on a detection signal received from the second sensor electrode, when the detection circuit provisionally judges that there was proximity of an object in a predetermined first number or more and less than a predetermined second number of the multiple detection periods, the drive circuit may supply, to the first sensor electrode, a drive signal of different frequencies respectively in next multiple detection periods, the different frequencies are also different from a plurality of frequencies of the drive signal in the plurality of detection periods, and the detection circuit may perform detection of proximity of an object, based on a detection signal received from the second sensor electrode in each of the next multiple detection periods.

In this case, when noise is present, it can be judged more certainly that it is not proximity of an object.

While various embodiments have been described herein above, it is to be appreciated that various changes in form and detail may be made without departing from the spirit and scope of the invention(s) presently or hereafter claimed.

The invention claimed is:

1. A detection device, comprising:
a drive circuit that supplies, to a first sensor electrode, a drive signal of a different frequency in each of a plurality of detection periods, the plurality of detection periods including a first detection period and a second detection period; and
a detection circuit that performs detection of proximity of an object, based on a detection signal received from a second sensor electrode disposed in a vicinity of the first sensor electrode in each of the plurality of detection periods, wherein
the drive circuit supplies the drive signal of a first frequency to the first sensor electrode in the first detection period and supplies the drive signal of a second frequency to the first sensor electrode in the second detection period,
the first frequency is not natural number multiples of the second frequency, and
the second frequency is not natural number multiples of the first frequency.

2. The detection device according to claim 1, wherein the detection circuit
provisionally judges the presence or absence of proximity of an object in each of the plurality of detection periods, based on a detection signal received from the second sensor electrode and formally judges that there was proximity of an object when it is provisionally judged that there was proximity of an object in a predetermined number or more of the plurality of detection periods.

3. The detection device according to claim 1, wherein the detection circuit provisionally judges the presence or absence of proximity of an object in each of the plurality of detection periods, based on a detection signal received from the second sensor electrode, when the detection circuit provisionally judges that there was proximity of an object in a predetermined first number or more and less than a predetermined second number of the plurality of detection periods, the drive circuit supplies, to the first sensor electrode, a drive signal of a frequency that is the frequency of the drive signal supplied during a detection period in which it was provisionally judged that there was no proximity of an object, in each of next plurality of detection periods, the next plurality of detection periods including a third detection period and a fourth detection period, the drive circuit supplies the drive signal of a third frequency to the first sensor electrode in the third detection period and supplies the drive signal of a fourth frequency to the first sensor electrode in the fourth detection period, and the detection circuit performs detection of proximity of an object, based on a detection signal received from the second sensor electrode in each of the next plurality of detection periods.

4. The detection device according to claim 1, wherein the detection circuit provisionally judges the presence or absence of proximity of an object in each of the plurality of detection periods, based on a detection signal received from the second sensor electrode, when the detection circuit provisionally judges that there was proximity of an object in a predetermined first number or more and less than a predetermined second number of the plurality of detection periods, the drive circuit supplies, to the first sensor electrode, a drive signal of different frequencies respectively in next plurality of detection periods, the different frequencies are also different from a plurality of frequencies of the drive signal in the plurality of detection periods, and the detection circuit performs detection of proximity of an object, based on a detection signal received from the second sensor electrode in each of the next plurality of detection periods.

5. The detection device according to claim 3, wherein, when the detection circuit provisionally judges that there was proximity of an object in less than the first number of the plurality of detection periods, the drive circuit supplies to the first sensor electrode a drive signal of different frequencies respectively in the next plurality of detection periods, the third frequency is not natural number multiples of the fourth frequency and is equal to the first frequency, and the fourth frequency is not natural number multiples of the third frequency and is equal to the second frequency.

6. The detection device according to claim 3, wherein, when it is provisionally judged that there was proximity of an object in the second number or more of the plurality of detection periods, the detection circuit formally judges that there was proximity of an object.

7. The detection device according to claim 2, wherein, when it is not provisionally judged that there was proximity of an object in the predetermined number or more of the plurality of detection periods, the detection circuit formally judges that there was no proximity of an object.

8. The detection device according to claim 2, wherein the detection circuit repeatedly performs a series of provisional and formal judgments until it is formally judged that there was proximity of an object.

9. The detection device according to claim 1, wherein
the second sensor electrode comprises a plurality of third electrodes, and
the detection circuit detects a third electrode to which there was proximity of an object, from among the plurality of third electrodes.

10. A detection device, comprising:
a drive circuit that supplies, to a first sensor electrode, a drive signal of a different frequency in each of a plurality of detection periods; and
a detection circuit that performs detection of proximity of an object, based on a detection signal received from a second sensor electrode disposed in a vicinity of the first sensor electrode in each of the plurality of detection periods, wherein
the first sensor electrode comprises a plurality of first electrodes extending in a first direction, and a plurality of second electrodes extending in a second direction that intersects the first direction, the plurality of first electrodes and the plurality of second electrodes intersect,
the drive circuit supplies a drive signal to the plurality of second electrodes in a first mode,
the detection circuit performs detection of a touch by an object in the first mode, based on a detection signal received from the plurality of first electrodes,
the drive circuit supplies, to the plurality of first electrodes and the plurality of second electrodes, a drive signal of a different frequency in each of the plurality of detection periods in a second mode, and
the detection circuit performs detection of proximity of an object in the second mode, based on a detection signal received from the second sensor electrode in each of the plurality of detection periods.

11. The detection device according to claim 10, wherein
the first sensor electrode is superimposed on a display region of a display device,
the second mode is selected in a standby state in which no image is displayed on the display device, and
when the detection circuit has detected proximity of an object in the second mode, the first mode is selected, and the display device starts image display.

12. The detection device according to claim 10, wherein
in the second mode, the detection period and a touch detection period are alternately arranged,
the drive circuit supplies a drive signal to the plurality of second electrodes in the touch detection period, and
the detection circuit performs detection of a touch by an object in the touch detection period, based on a detection signal received from the plurality of first electrodes.

13. The detection device according to claim 12, wherein
the first sensor electrode is superimposed on a display region of a display device, the second mode is selected in a standby state in which no image is displayed on the display device, and
when the detection circuit has detected proximity or a touch of an object in the second mode, the first mode is selected, and the display device starts image display.

14. The detection device according to claim 12, wherein the touch detection period is shorter than the detection period.

15. A detection method, comprising:
supplying, to a first sensor electrode, a drive signal of a different frequency in each of a plurality of detection periods, the plurality of detection periods including a first detection period and a second detection period; and
performing detection of proximity of an object, based on a detection signal received from a second sensor electrode disposed in a vicinity of the first sensor electrode in each of the plurality of detection periods, wherein
the drive signal of a first frequency is supplied to the first sensor electrode in the first detection period,
the drive signal of a second frequency is supplied to the first sensor electrode in the second detection period,
the first frequency is not natural number multiples of the second frequency, and
the second frequency is not natural number multiples of the first frequency.

16. The detection device according to claim 1, wherein
the plurality of detection periods further includes a fifth detection period,
the drive circuit supplies the drive signal of a fifth frequency to the first sensor electrode in the fifth detection period,
the first frequency is not natural number multiples of the fifth frequency,
the second frequency is not natural number multiples of the fifth frequency,
the fifth frequency is not natural number multiples of the first frequency, and
the fifth frequency is not natural number multiples of the second frequency.

17. The detection device according to claim 5, wherein
the third detection period in the next plurality of detection periods corresponds to the first detection period in the plurality of detection periods, and
the fourth detection period in the next plurality of detection periods corresponds to the second detection period in the plurality of detection periods.

* * * * *